US010989100B1

(12) United States Patent
Kubsch

(10) Patent No.: US 10,989,100 B1
(45) Date of Patent: Apr. 27, 2021

(54) ENGINE COOLING SYSTEM AND THERMOSTAT THERMAL ACTUATOR WITH A DEGASSING TWO-STAGE PISTON

(71) Applicant: Thomas Kubsch, Elizaville, NY (US)

(72) Inventor: Thomas Kubsch, Elizaville, NY (US)

( * ) Notice: Subject to any disclaimer, the term of this patent is extended or adjusted under 35 U.S.C. 154(b) by 0 days.

(21) Appl. No.: 16/832,359

(22) Filed: Mar. 27, 2020

(51) Int. Cl.
*F01P 7/14* (2006.01)
*F01P 7/16* (2006.01)
*F16K 31/00* (2006.01)
*F01P 11/02* (2006.01)

(52) U.S. Cl.
CPC ............... *F01P 7/16* (2013.01); *F01P 11/028* (2013.01); *F16K 31/002* (2013.01); *F01P 2007/146* (2013.01)

(58) Field of Classification Search
CPC .......... F01P 7/16; F01P 7/167; G05D 23/022; G05D 23/1333
USPC ...................................................... 123/41.08
See application file for complete search history.

(56) References Cited

U.S. PATENT DOCUMENTS

| 6,508,212 B2 | 1/2003 | Song et al. |
| 7,082,903 B2 | 8/2006 | Hutchins |
| 7,096,831 B2 | 8/2006 | Finkbeiner et al. |
| 8,893,979 B2* | 11/2014 | Kusakabe ............ G05D 23/022 236/34.5 |
| 9,146,176 B2 | 9/2015 | Nishi |
| 10,287,965 B2 | 5/2019 | Spenny |
| 10,677,118 B2* | 6/2020 | Miyajima ................ F04C 14/24 |
| 2008/0223316 A1* | 9/2008 | Banta .................... G05D 23/022 123/41.1 |

(Continued)

FOREIGN PATENT DOCUMENTS

| JP | H0727250 A | 10/1995 |
| JP | H0882217 A | 3/1996 |
| WO | 20020929986 A1 | 11/2002 |

OTHER PUBLICATIONS

Design and Application of Thermostats to the Cooling System of the Internal-Combustion Engine, S. H. Blazey, Jan. 1, 1956, Proceedings of the Institution of Mechanical Engineers: Automobile Division, vol. 10 issue: 1, pp. 187-192.

(Continued)

*Primary Examiner* — Long T Tran
*Assistant Examiner* — James J Kim
(74) *Attorney, Agent, or Firm* — B K Patents, Inc; Billy J. Knowles

(57) ABSTRACT

A two-stage piston in a thermostat's thermal actuator is configured for degassing entrained air from a coolant system. The first-stage part has a cylindrical shape and is terminated at one end with a rounded-conical shape and having a cylindrical cavity at an opposite end. A second-stage part has a cylindrical shape with a diameter sufficient to fit within the cylindrical cavity. A sacrificial plug is formed of a wax-like substance with a melting temperature such that the entrained air escapes from the coolant system through the thermostat. The diameter of the sacrificial plug allows placement of the sacrificial plug in a bottom of the cylindrical cavity and a length of the two-stage piston with the sacrificial plug in place forces the valve to remain open. After the sacrificial plug has melted, the length of the two-stage piston will open and close the valve with a change in coolant temperature.

21 Claims, 7 Drawing Sheets

(56) References Cited

U.S. PATENT DOCUMENTS

| | | | |
|---|---|---|---|
| 2012/0211216 A1* | 8/2012 | Noonchester | F01M 5/007 |
| | | | 165/271 |
| 2015/0369113 A1* | 12/2015 | Arbel | F01P 7/16 |
| | | | 236/34.5 |
| 2016/0069330 A1* | 3/2016 | McDonald | F03G 7/06 |
| | | | 60/527 |

OTHER PUBLICATIONS

"Products / Thermal Actuators", Copyright 2018 Shanghai Tu-Poly Industrial Co.,Ltd, \Shanghai, China, Found Feb. 20, 2020 at: https://www.thermal-actuators.com/thermal-actuators.

* cited by examiner

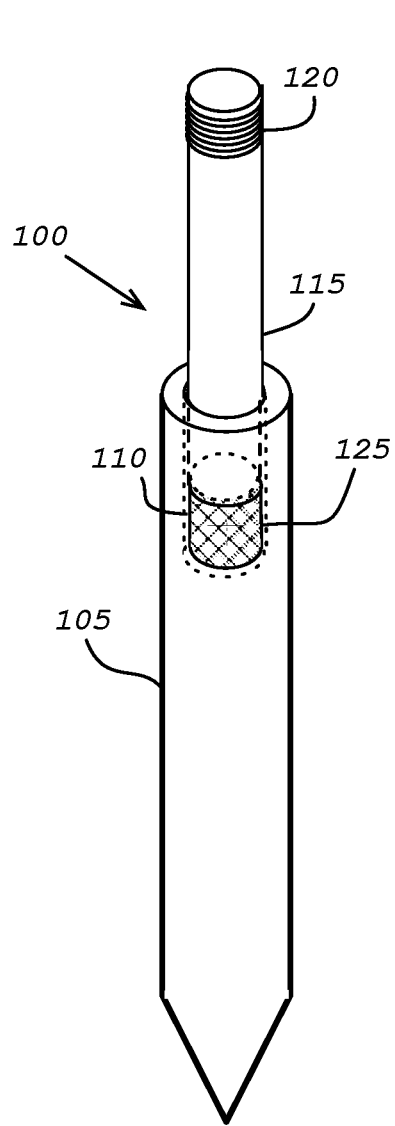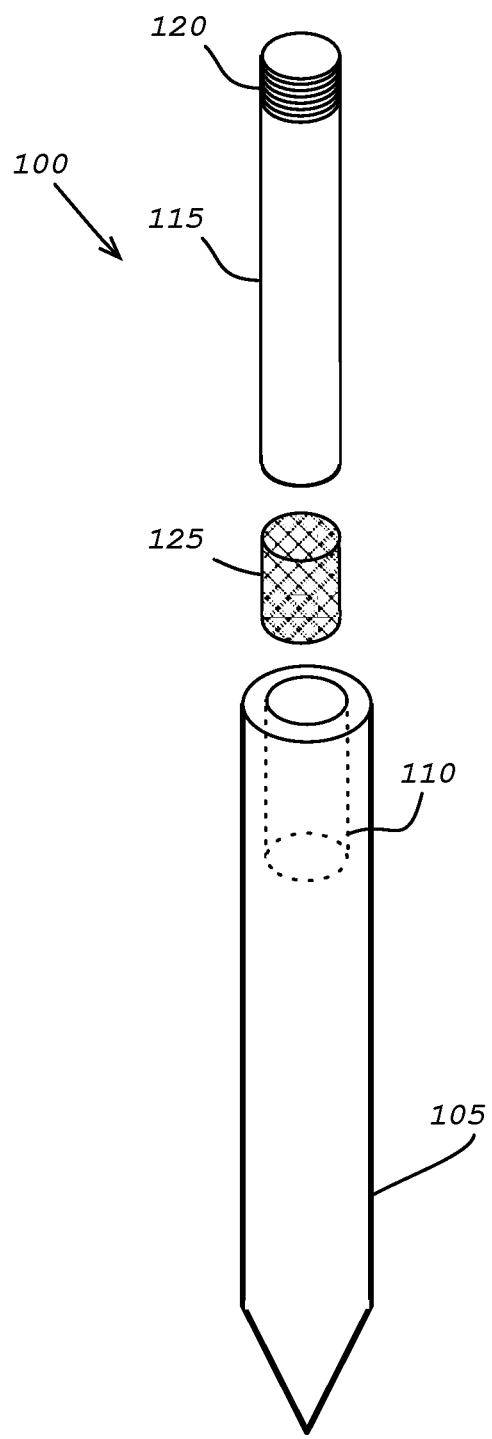
FIG. 3A
FIG. 3B

ENGINE COOLING SYSTEM AND THERMOSTAT THERMAL ACTUATOR WITH A DEGASSING TWO-STAGE PISTON

TECHNICAL FIELD

This disclosure relates generally to a to a thermostat for the cooling system of a liquid cooled internal combustion engine. More particularly, this disclosure relates to a thermal actuator within the thermostat. Even, more particularly, this disclosure relates to a thermal actuator comprising two-stage piston structure to allow degassing or deaeration for the removal of air from an internal combustion engine cooling system.

BACKGROUND

As is known in the art, the head and block of an internal combustion engine (hereinafter referred to as an engine) has passages cast in them for the transfer of a cooling liquid such as an admixture of water and an antifreeze chemical. A port formed at an external surface of the block to accept a coupling. The coupling is connected to a hose for transport of coolant between the engine and a radiator. The radiator acts as a heat exchanger for the transfer of the engine heat to the ambient air. A thermostat is placed in the coupling to control the flow of the cooling liquid.

When technicians and mechanics must replace faulty thermostats, a relatively simple repair may become complicated. When the cooling liquid is drained from the cooling system, the system becomes "air-bound" as it is refilled with coolant. Pockets of air occur and the coolant does is not in contact with the thermostat.

The typical thermostat contains a wax capsule in its core. If the cooling liquid cannot reach the thermostat, heat is not able to transfer from the engine via the cooling liquid to the wax core. The thermostat does not open and the engine overheats. The method that technicians and mechanics use to degas or de-aerate the coolants is to bleed air from the coolant within the engine cooling system by removing the radiator cap from the radiator, running the engine until the radiator bleeds out air. When the engine reaches the proper temperature, the cooling liquid will begin cycling through the system. The coolant level drop as the air is cycled out, and air bubbles escape from the radiator. This process may need to be repeated several times. This undesirably consumes additional time of the technician or mechanic.

SUMMARY

An object of this disclosure is to provide thermostat with a thermal actuator configured for maintaining a thermostat in an open position in a cold engine during air bleeding or de-aeration after installation of the thermostat in an engine.

Another object of this disclosure is to provide a thermal actuator with a two-stage piston configured with a sacrificial plug for maintaining a valve of the thermostat open in a cold engine.

To accomplish at least one of these objects, a thermal actuator has a two-stage piston. The two stage piston has a first-stage formed of a metal such a stainless steel in a cylindrical shape terminated at one end with rounded conical structure. The first-stage of the two-stage piston has a cylindrical opening formed at a second end of the first-stage. The two-stage piston has a second-stage that has a diameter to fit within the cylindrical opening of the second end of the first-stage.

A sacrificial plug is cylindrical in shape with a diameter to fit into the cylindrical opening and a length sufficient to hold a valve of the thermostat in an open position during degassing or de-aeration of the coolant within the cooling system. The sacrificial plug is a wax selected to have a melting point less than the operating temperature of the engine or approximately 120° F. (approximately 49° C.).

The sacrificial plug is placed in the cylindrical opening of the first stage of the two-stage piston and the second stage of the two-stage piston is placed in the cylindrical opening of the first stage to complete assembly of the two-stage piston.

The difference in the cylindrical opening formed at the second end of the first-stage and the diameter of the cylindrical shape of the second-stage is such that melted wax of a sacrificial plug placed between the bottom of the cylindrical opening of the first and a first end of the second-stage can flow from the cylindrical opening of the first-stage around the periphery of the second-stage. The second stage further has means at a second end of the second stage for securing the two-stage piston to an attachment point of a flange on a thermostatic valve.

In some embodiments that accomplish at least one of these objects, a thermostat has a flange configured for seating a valve for directing flow of coolant through the thermostat. The thermostat further includes a thermal actuator including a two-stage piston with an end secured at an upper portion of the flange. The flange is attached to a lower frame. The lower frame has an opening for holding a thermal actuator. The thermal actuator is structured to allow the two-stage piston to move in a reciprocating action. The valve is attached to the thermal actuator for controlling the opening and closing of the valve based on the reciprocating action of the two-stage piston.

At initial installation, the two-stage piston that is configured as described above. When the thermostat is installed in a cooling system, the sacrificial plug causes the valve to remain open during the degassing or de-aeration process of the installation. When a coolant of the cooling system is cool, the coolant that flows through the thermostat to a heat exchanging radiator and the entrain air is allowed to escape. When the engine has reached a temperature of the melting point of the sacrificial plug, the valve of the thermostat closes and the thermostat operates normally.

BRIEF DESCRIPTION OF THE DRAWINGS

FIG. 3A is a diagram of an isometric view of a two-stage piston of a thermostat embodying the principles of the present disclosure.

FIG. 3B is a diagram of an exploded view of a two-stage piston of a Thermostat embodying the principles of the present disclosure.

DETAILED DESCRIPTION

Figure 1:
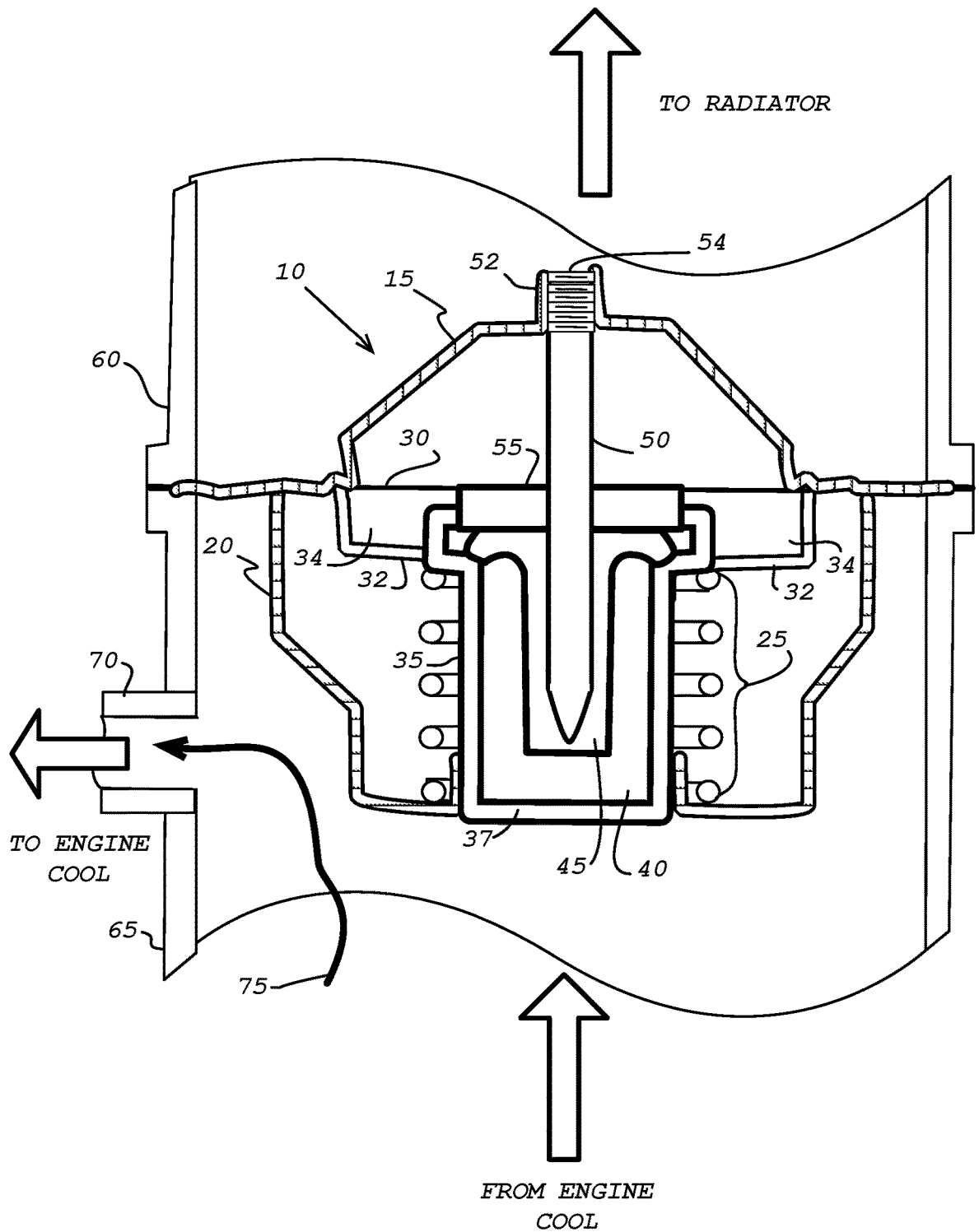
FIG. 1 is a cross sectional diagram of a thermostat in the closed position of the prior art.
Figure 2:
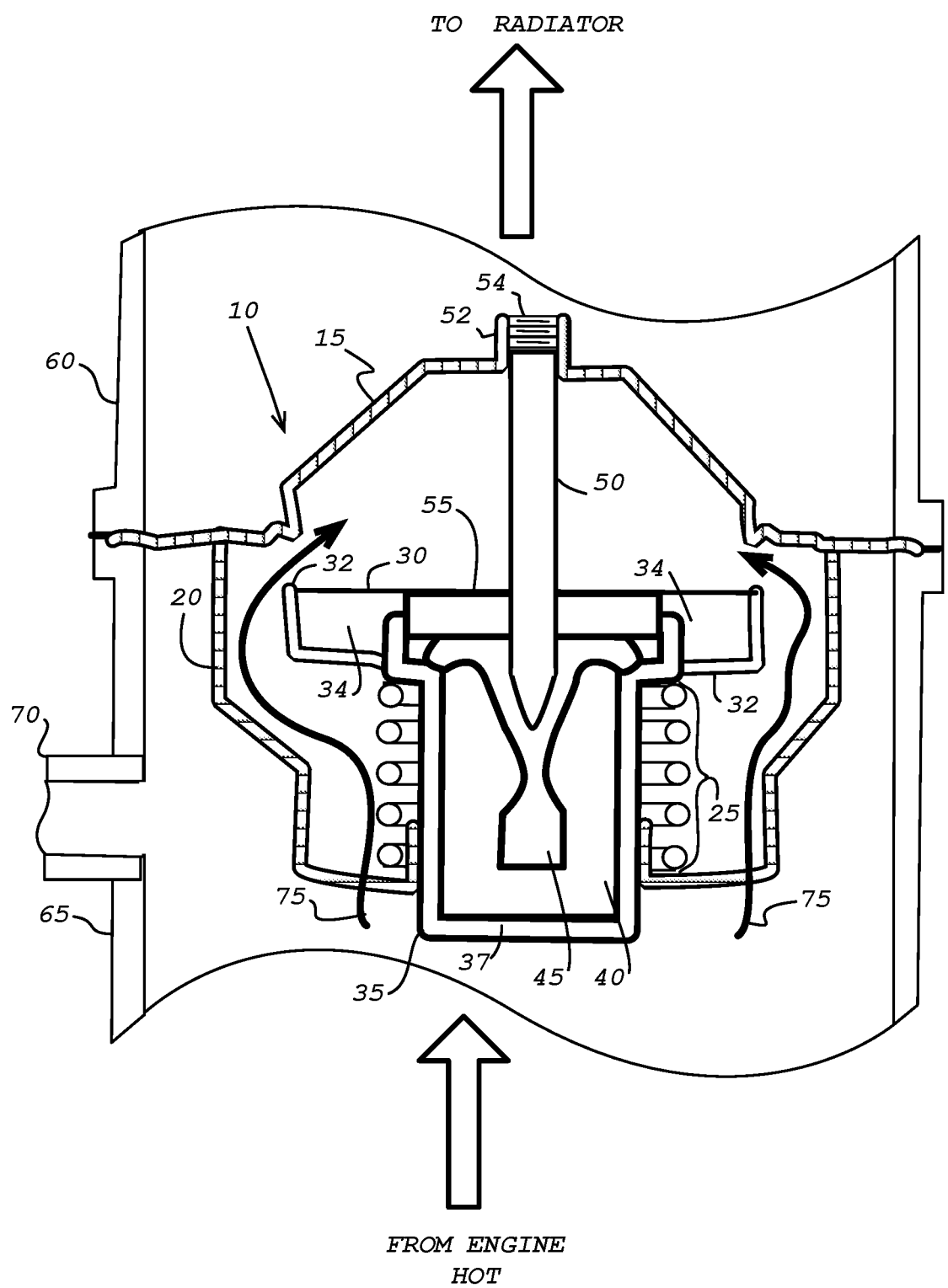
FIG. 2 is a cross sectional diagram of a thermostat in the open position of the prior art.

FIGS. 1 and 2 are cross sectional diagrams of a thermostat 10 of the prior art. FIG. 1 illustrates the thermostat 10 in the closed position and FIG. 2 is a cross sectional diagram of a thermostat 10 in the open position. In this explanation the thermostat 10 is a wax cartridge thermostat. In other embodiments, other temperature to motion detection methods may be used. A flange 15 is connected to a frame 20 to form a support structure of the thermostat 10. The flange 15 is secured to a coupling 60 connected to a hose leading to a radiator and secured to a coupling 65 that is connected to the engine.

A thermal actuator 35 is placed in an opening of the frame 20 such that it is able to move vertically through the opening in the frame 20 dependent on the temperature to motion action of the thermal actuator. The thermal actuator 35 has a metal cylinder 37 that is configured to receive a wax pellet 40 and a rubber sleeve 45. The wax pellet 40 is modified to have a melting temperature of between 180° and 195° F. (82°-91° C.) by the addition of powdered copper, graphite, and/or aluminum. The thermal actuator 35 has a diameter the is sufficient to slide through an opening of the frame 20.

A valve 30 is mounted to the top of the thermal actuator 35 with a valve frame 32. The valve frame 32 is structured to have a knife edge seal with the flange 15. The valve frame has a sealing material 34 that is held with the valve frame to completely seal the valve 30 such that the coolant 75 cannot pass to the radiator (not shown) when the thermostat 10 is below its activation point.

A spring 25 is placed in the frame 20 and surrounds the thermal actuator 35 to force the valve 30 to seat against the flange 15 to prevent the flow of the coolant 75 to the radiator.

A bushing 55 is placed at the top of the rubber sleeve 45 to allow the piston 55 slide into the rubber sleeve 45. The bushing 55 seals the interior of the rubber sleeve 45 and the surface of the piston 50 from the coolant 75. The flange 15 has an opening that is threaded 52 to accept the piston 50. The piston 50 has an upper portion that is similarly threaded 54 to secure the piston 50 to the flange 15 such that the piston remains stationary relative to the flange 15.

When the engine is cold, the coolant 75 is forced into the thermostat 10 from the engine and since the thermostat 10 is closed, the coolant 75 is steered toward the by-pass coupling 70 and back to the engine. A secondary thermostat (not shown) controls the flow of the coolant 75 through the secondary coupling 70.

When the wax pellet 40 has reached its melting point of between approximately 180° (82° C.) and approximately 195° F. (91° C.), the melting wax pellet 40 begins to expand as shown in FIG. 2. As the wax pellet 40 expands, it impinges upon the rubber sleeve 45 thus forcing the thermal actuator 35 to slide down the piston 50 through the opening in the frame 20. As the thermal actuator 35 moves, the valve 30 opens and the coolant 75 is diverted to flow through the open valve 30 to the coupling 60 and to the radiator.

When the wax pellet 40 cools to be less than its melting point of between approximately 180° (82° C.) and approximately 195° F. (91° C.), the wax pellet 40 hardens and contracts as shown in FIG. 1. As the wax pellet 40 contracts, the rubber sleeve 45 thus forcing the thermal actuator 35 to slide up the piston 50 through the opening in the frame 20. As the thermal actuator 35 moves up, the valve 30 closes and the coolant 75 is diverted to flow through the bypass coupling 70 to return to the engine.

As noted above, to overcome air pockets that air-bound the cooling system and prevent coolant from touching the thermostat 10, a mechanic typically runs the vehicle until it overheats or almost overheats. The mechanic then shuts off the vehicle to allow the engine to "heat soak". This purges the air and allows for more coolant to be added. This "run engine/shut off/heat soak" process may have to be repeated multiple times before the thermostat 10 operates normally and the engine runs at its proper temperature.

FIG. 3A is a diagram of an isometric views of a two-stage piston 100 of a thermostat 10 embodying the principles of the present disclosure. FIG. 3B is an exploded view of a two-stage piston 100 of a thermostat 10 embodying the principles of the present disclosure. A two-stage piston 100 has a first-stage 105 formed of a metal such a stainless steel in a cylindrical shape terminated at one end with conical end. In some embodiments, the one end may be a hemispherical end, or other shape that will allow the two-stage piston 100 to slide in the rubber sleeve 45. The first-stage 105 has a cylindrical opening 110 formed at a second end of the first-stage 105. The two-stage piston 100 has a second-stage 115 that has dimensions to fit in the cylindrical opening 110 of the second end of the first-stage 105. The difference in the cylindrical opening 110 formed at the second end of the first-stage 105 and the diameter of the cylindrical shape of the second-stage 115 is such that melted wax of a sacrificial wax plug 125 placed at a first end of the second-stage 115 can flow from the cylindrical opening 110 of the first-stage 105 around the periphery of the second-stage 115.

The sacrificial plug is formed of a wax selected such that it has a melting temperature of approximately 120° F. (48.9° C.). Further, the wax of the sacrificial plug must be able to withstand the pressure of the spring 50 applied to close the valve 30 and not cause the wax to be forced into the space between the second stage 105 and the wall of the opening 110 of the first stage of the two-stage piston.

The second stage 115 further has a threaded area 120 placed at an opposite end of the second stage 115 from the location of the sacrificial plug 125. The threaded area 120 secures the two-stage piston 100 in the threaded opening 52 of the flange 15 on a thermostatic valve. In other embodiments, the threaded area may be a spherical or cylindrical metal appendage (not shown) to which the threaded opening of the flange 15 is not threaded but mechanically crimped or riveted to secure the spherical or cylindrical metal appendage to the flange 15. Any method of fastening the second stage 115 of the two-stage piston 100 to the flange 15 is in keeping with the principles of this disclosure.

Figure 4:
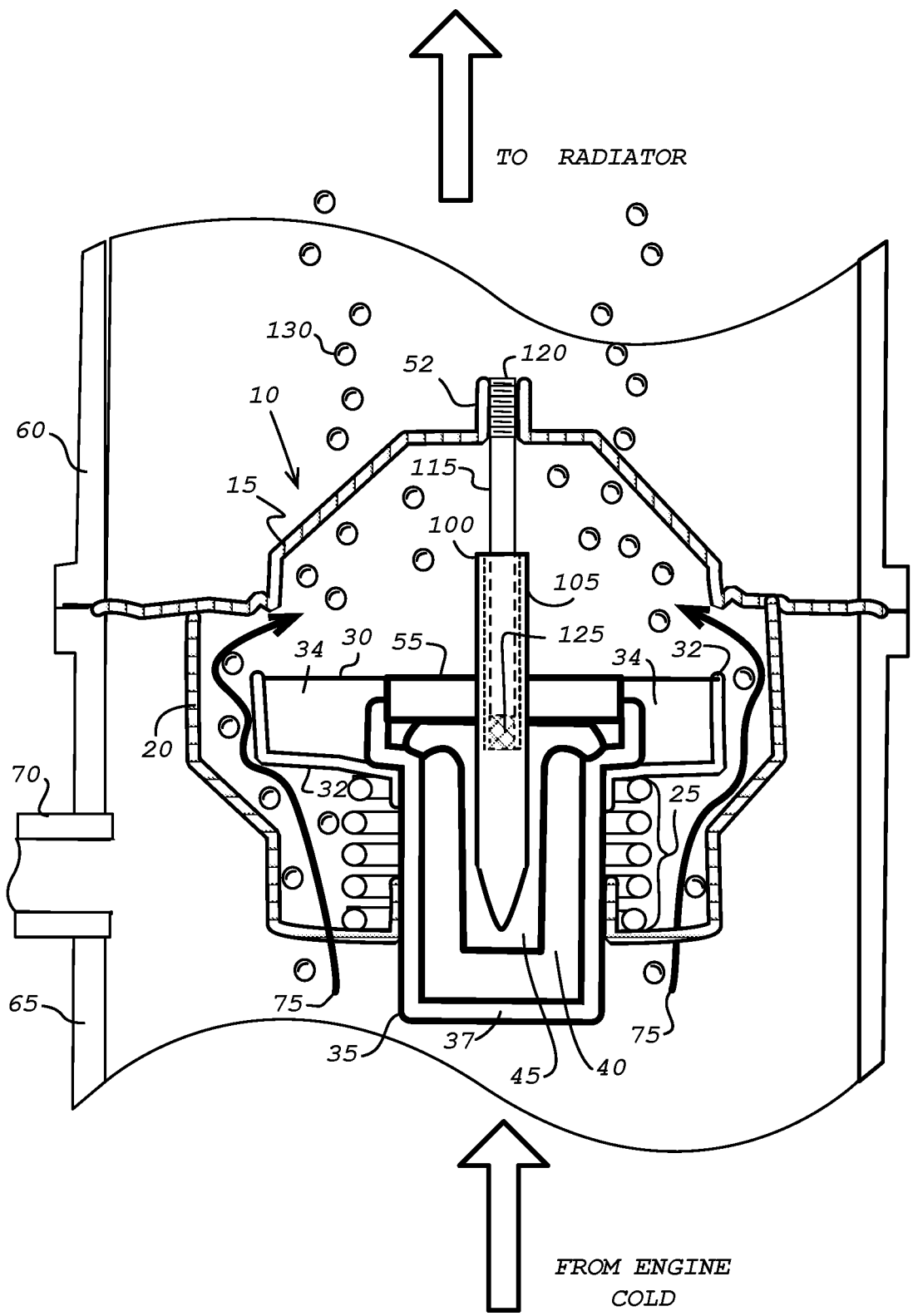
FIG. 4 is a cross sectional diagram of a thermostat in the open position in a cold engine and incorporating the two-stage piston of a thermostat embodying the principles of the present disclosure.

FIG. 4 is a cross sectional diagram of a 10thermostat 10 in the open position in a cold engine and incorporating the two-stage piston of a thermostat 10 embodying the principles of the present disclosure. The structure of the thermostat 10 is identical to that of FIGS. 1 and 2 and is labeled identically. The difference is the installation of the two-stage piston 100. The first stage 105 of the two stage piston 100 is as described in FIGS. 3A and 3B with the opening 110 into which the sacrificial wax plug 125 and the second stage 115 of the two-stage piston 100. The threaded end of the second stage 120 is fastened to the threaded opening of the flange 15 as described above.

The thermostat 10 is mounted in the engine (not shown) through the coupling 65 and to the radiator (not shown) through the coupling 60. The two-stage piston 100 with the sacrificial wax plug 125 in place forces the valve 30 to be open. A coolant pump (not shown) circulates the coolant such that coolant flow 75 is forced through the open thermostat 10 to the radiator. Air 130 entrained in the coolant may be trapped in the engine causing the coolant system to air bound. With the wax plug holding the thermostat 10 open, the entrained air 130 is able to escape to the radiator where it is able to be vented to the atmosphere.

Figure 5:
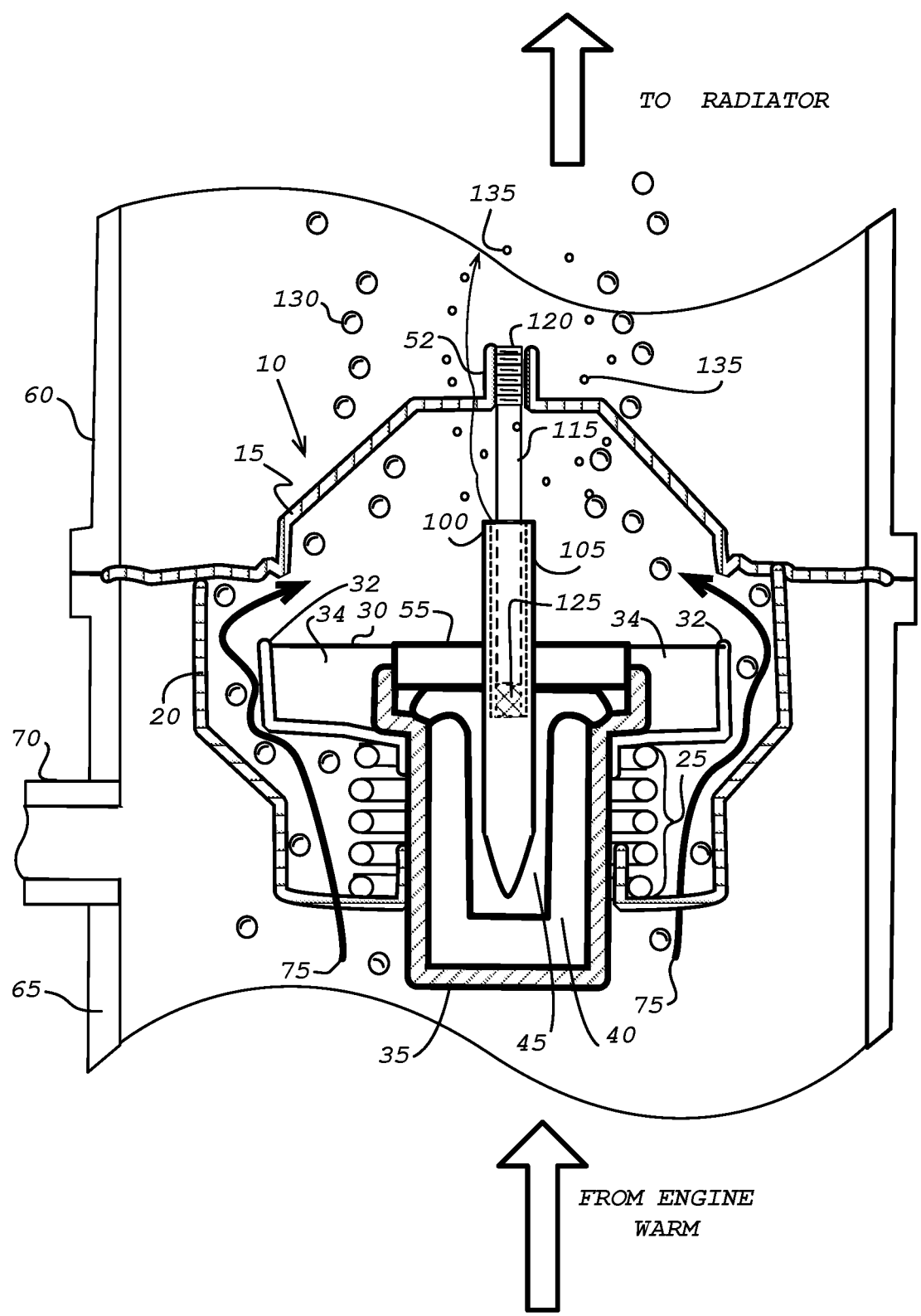
FIG. 5 is a cross sectional diagram of a thermostat in the open position in a warm engine and incorporating the two-stage piston of a thermostat embodying the principles of the present disclosure.
Figure 6:
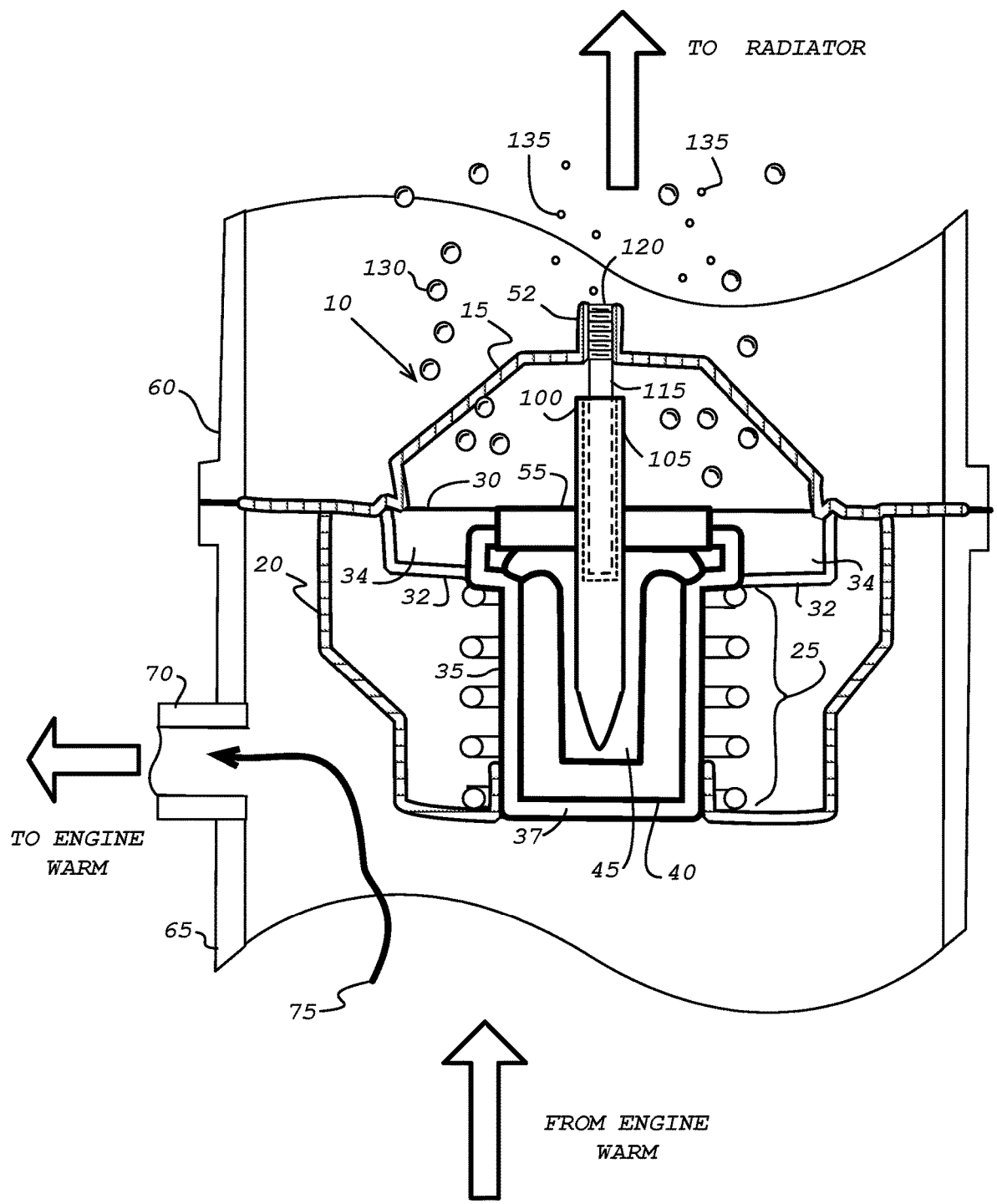
FIG. 6 is a cross sectional diagram of a thermostat in the closed position in a warm engine and incorporating the two-stage piston of a thermostat embodying the principles of the present disclosure.
Figure 7:
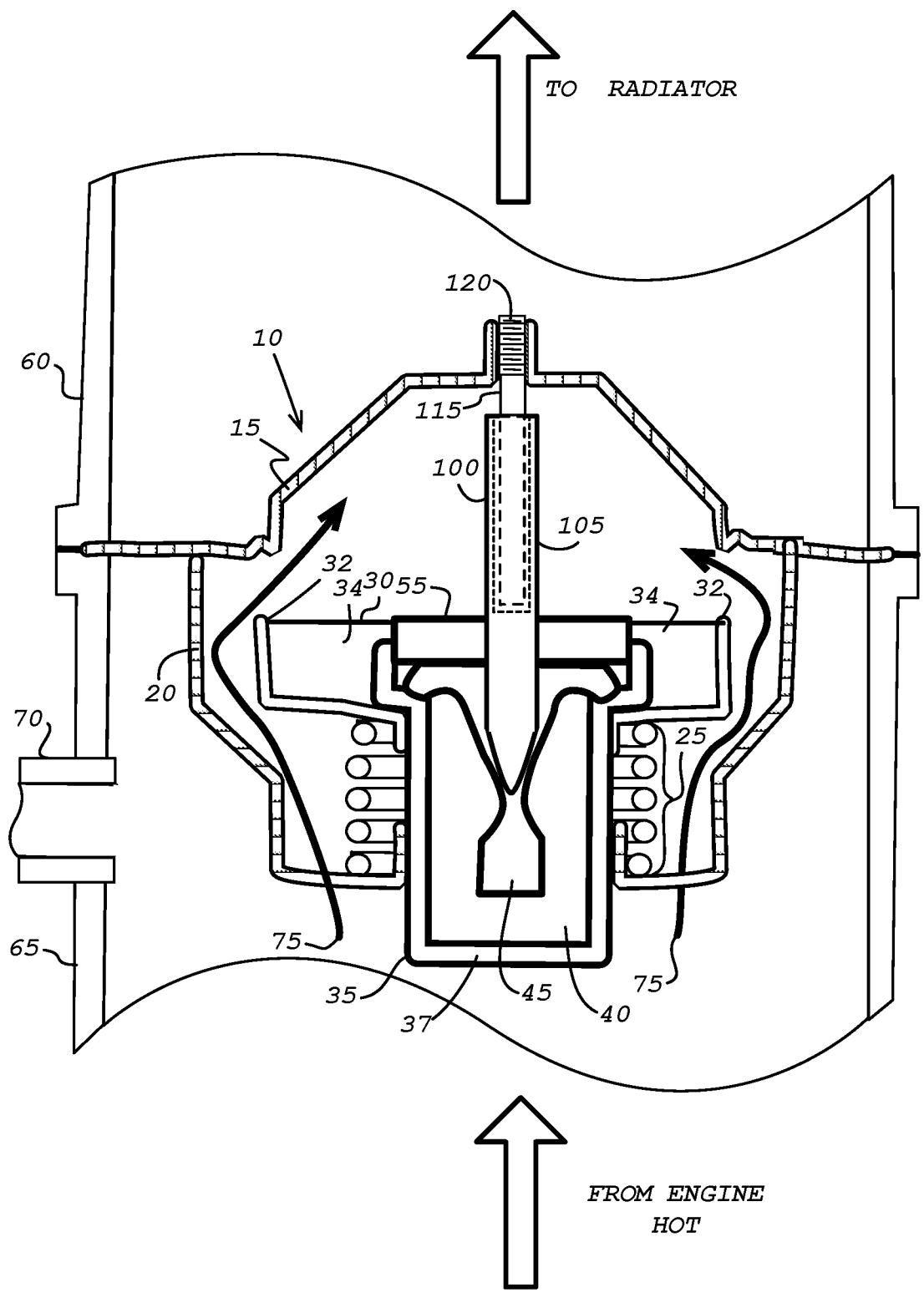
FIG. 7 is a cross sectional diagram of a thermostat in the closed position in a hot engine and incorporating the two-stage piston of a thermostat embodying the principles of the present disclosure.

FIGS. 5, 6, and 7 are cross sectional diagrams of the thermostat 10 identical to FIG. 4. The exception in FIG. 5 is that the engine is reaching the melting temperature of the wax sacrificial plug 125 and the sacrificial wax plug 125 is beginning to melt. The wax 125 is flowing in the space between the second stage 105 and the wall of the opening 110 of the first stage 105 of the two-stage piston 100 into the open area of the thermostat 10 and into the coupling 60 to the radiator. The entrained air is similarly flowing into the thermostat 10 with the flow 75 of the coolant to the radiator.

In FIG. 6, the engine temperature has risen sufficiently that the sacrificial wax plug 125 has melted is not supporting the second-stage 115 and the spring has forced the first stage to rise in the rubber sleeve 45. The valve is thus closed shutting off the flow 75 of the coolant through the thermostat 10. The entrained air 130 and the melted wax 135 will continue to float to the radiator. The coolant flow 75 will be forced into the bypass coupling 70 back to the engine.

In FIG. 7, the engine temperature has reached its maximum operating temperature and the Thermostat 10 has its valve 30 in an open position. The entrained air has escaped to the radiator and the melted wax is dissolved in the engine coolant. The coolant is an oxygen-containing polar organic liquid such as ethylene glycol and propylene glycol as used in current antifreeze products.

While this disclosure has been particularly shown and described with reference to the preferred embodiments thereof, it will be understood by those skilled in the art that various changes in form and details may be made without departing from the spirit and scope of the disclosure. In particular, the description for this disclosure provides a thermostat 10. However, the two-stage piston 100 of this disclosure is applicable to other temperature reactive structures that will cause the two-stage piston 100 to move to open or close the valve 30. An example of an alternate to the thermostat 10 is a bellows type thermostat. The bellows provides the expansion and contraction for opening and closing the valve of the thermostat 10.

What is claimed is:

1. A two-stage piston placed in a thermal actuator of a thermostat for opening and closing a valve within the thermostat and configured for degassing entrained air at installation from a coolant with a coolant system, wherein the two-stage piston comprises:
    first-stage part configured for opening and closing the valve to control coolant flow based on a temperature to motion conversion of a thermal activator of the thermostat and further configured with a cylindrical shape and terminated at one end with a rounded-conical shape and having a cylindrical cavity at an opposite end;
    a second-stage part configured with a cylindrical shape with a diameter sufficient to allow the second stage part to fit within the cylindrical cavity; and
    a sacrificial plug formed of a substance with a melting point such that the entrained air escapes from the coolant system through the thermostat and having a diameter sufficiently large enough to be placed in a bottom of the cylindrical cavity and a length such that when the second stage part is placed in the cylindrical cavity and seated on the sacrificial plug, a length of the two stage piston with the sacrificial plug in place forces the valve to remain open;
    wherein, the length of the first-stage part having the second-stage part seated in the cylindrical cavity after the sacrificial plug has melted will cause the valve to open and close with a change in temperature.

2. The two-stage piston of claim 1 wherein the first stage part and the second stage part are stainless steel.

3. The two stage piston of claim 1 wherein the substance of the sacrificial plug is a wax with a melting temperature less than an operating temperature of coolant system.

4. The two stage piston of claim 2 wherein the melting temperature of the wax sacrificial plug is approximately 120° F. (approximately 49° C.).

5. The two stage piston of claim 1 wherein the second stage part has an end assembly structured to be secured to a flange of the thermostat.

6. The two stage piston of claim 5 wherein the end assembly of the second stage part is a threading for mating with a threading nut of the flange of the thermostat.

7. The two stage piston of claim 5 wherein the end assembly of the second stage part is a spherical link for mating with a coupling and riveted to the flange of the thermostat.

8. A thermostat configured for degassing entrained air at installation from a coolant within a cooling system, the thermostat comprising:
    a valve configured for directing flow of coolant through the thermostat;
    a flange configured for providing a sealing surface when closing the valve;
    a frame connected to flange for providing structure and support for the thermostat;
    a thermal activator configured for opening and closing a valve within the thermostat comprising:
        a cup configured for sliding through an opening in the frame;
        a wax or wax like substance with a melting temperature set at an operating temperature of the cooling system;
        an elastic bag configured for enclosing the wax or wax like substance within the cup;
        a two-stage piston placed within the elastic bag and secured to an upper surface of the flange, the two-stage piston comprising:
            first-stage part configured for opening and closing the valve to control coolant flow based on a temperature to motion conversion of a thermal activator of the thermostat and further configured with a cylindrical shape and terminated at one end with a rounded-conical shape and having a cylindrical cavity at an opposite end;
            a second-stage part configured with a cylindrical shape with a diameter sufficient to allow the second stage part to fit within the cylindrical cavity; and
            a sacrificial plug formed of a substance with a melting point such that the entrained air escapes from the coolant system through the thermostat and having a diameter sufficiently large enough to be placed in a bottom of the cylindrical cavity and a length such that when the second stage part is placed in the cylindrical cavity and seated on the sacrificial plug, a length of the two stage piston with the sacrificial plug in place forces the valve to remain open;

wherein, the length of the first-stage part having the second-stage part seated in the cylindrical cavity after the sacrificial plug has melted will cause the valve to open and close with a change in temperature.

9. The thermostat of claim 8 wherein the first stage part and the second stage part of the two-stage piston are stainless steel.

10. The thermostat of claim 8 wherein the substance of the sacrificial plug of the two-stage piston is a wax or wax like substance with a melting temperature less than an operating temperature of coolant system.

11. The thermostat of claim 10 wherein the melting temperature of the sacrificial plug is approximately 120° F. (approximately 49° C.).

12. The thermostat of claim 8 wherein the second stage part of the two stage piston has an end assembly structured to be secured to a flange of the thermostat.

13. The thermostat of claim 12 wherein the end assembly of the second stage part is a threading for mating with a threading nut of the flange of the thermostat.

14. The thermostat of claim 12 wherein the end assembly of the second stage part is a spherical link for mating with a coupling and riveted to the flange of the thermostat.

15. A method of removing entrained air from a coolant in a cooling system of an internal combustion engine, the method comprising the steps of:

providing a thermostat configured for degassing entrained air at installation from a coolant within a cooling system, wherein the thermostat comprises:
  a valve configured for directing flow of coolant through the thermostat;
  a flange configured for providing a sealing surface when closing the valve;
  a frame connected to flange for providing structure and support for the thermostat;
  a thermal activator configured for opening and closing a valve within the thermostat comprising:
    a cup configured for sliding through an opening in the frame,
    a wax or wax like substance with a melting temperature set at an operating temperature of the cooling system,
    an elastic bag configured for enclosing the wax or wax like substance within the cup,
    a two-stage piston placed within the elastic bag and secured to an upper surface of the flange, the two-stage piston comprising:
      first-stage part configured for opening and closing the valve to control coolant flow based on a temperature to motion conversion of a thermal activator of the thermostat and further configured with a cylindrical shape and terminated at one end with a rounded-conical shape and having a cylindrical cavity at an opposite end,
      a second-stage part configured with a cylindrical shape with a diameter sufficient to allow the second stage part to fit within the cylindrical cavity, and
      a sacrificial plug formed of a substance with a melting point such that the entrained air escapes from the coolant system through the thermostat and having a diameter sufficiently large enough to be placed in a bottom of the cylindrical cavity and a length such that when the second stage part is placed in the cylindrical cavity and seated on the sacrificial plug, a length of the two stage piston with the sacrificial plug in place forces the valve to remain open;

installing the thermostat in the cooling system of the internal combustion engine, wherein the cooling system includes a radiator connected by coolant carrying lines to the internal combustion engine, wherein the coolant carrying lies are connected to the internal combustion engine with the coupling configured such that the thermostat is installed in one coupling at the outlet of an internal combustion engine block; and removing a fill cap of the radiator to allow the entrained air to escape the coolant system; and melting the sacrificial plug such that the length of the first-stage part having the second-stage part seated in the cylindrical cavity causes the valve to open and close with a change in temperature.

16. The method of claim 15 wherein the first stage part and the second stage part of the two-stage piston are stainless steel.

17. The method of claim 15 wherein the substance of the sacrificial plug of the two-stage piston is a wax or wax like substance with a melting temperature less than an operating temperature of coolant system.

18. The method of claim 17 wherein the melting temperature of the sacrificial plug is approximately 120° F. (approximately 49° C.).

19. The method of claim 15 wherein the second stage part of the two stage piston has an end assembly structured to be secured to a flange of the thermostat.

20. The method of claim 19 wherein the end assembly of the second stage part is a threading for mating with a threading nut of the flange of the thermostat.

21. The method of claim 19 wherein the end assembly of the second stage part is a spherical link for mating with a coupling and riveted to the flange of the thermostat.

* * * * *